United States Patent
Lee et al.

(10) Patent No.: US 8,125,753 B2
(45) Date of Patent: Feb. 28, 2012

(54) BROWNOUT RIDE-THROUGH SYSTEM AND METHOD

(75) Inventors: Ping Soon Lee, Fox Point, WI (US); Jeffery John Battani, Waterford, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1624 days.

(21) Appl. No.: 11/241,125

(22) Filed: Sep. 30, 2005

(65) Prior Publication Data
US 2007/0076341 A1    Apr. 5, 2007

(51) Int. Cl.
*H01H 9/00* (2006.01)
*H02H 7/00* (2006.01)
*H02J 9/00* (2006.01)

(52) U.S. Cl. ............. 361/160; 361/62; 307/64

(58) Field of Classification Search .......... 307/130, 307/132 E, 104, 64, 48, 415, 103; 361/86, 361/92, 187, 160, 62; 335/239, 247, 193; 327/383
See application file for complete search history.

(56) References Cited

U.S. PATENT DOCUMENTS

| | | | | |
|---|---|---|---|---|
| 3,777,294 A * | 12/1973 | Grenier | ......................... | 335/236 |
| 4,238,749 A * | 12/1980 | Lawson et al. | .................. | 335/63 |
| 5,400,203 A * | 3/1995 | Tice | ................................ | 361/62 |
| 5,596,471 A * | 1/1997 | Hanlin | .......................... | 361/92 |
| 5,604,656 A * | 2/1997 | Derrick et al. | .................. | 361/92 |
| 5,619,076 A * | 4/1997 | Layden et al. | .................. | 307/48 |
| 5,661,625 A * | 8/1997 | Yang | .............................. | 361/92 |
| 6,316,918 B1* | 11/2001 | Underwood et al. | ........... | 322/20 |
| 6,643,112 B1* | 11/2003 | Carton et al. | ................. | 361/152 |
| 7,112,897 B2* | 9/2006 | Strong, III | ...................... | 307/48 |

* cited by examiner

*Primary Examiner* — Michael Rutland Wallis
(74) *Attorney, Agent, or Firm* — Fletcher Yoder P.C.; Alexander R. Kuszewski; John M. Miller

(57) ABSTRACT

A device is provided for riding through brownouts, or transitory losses of control power applied to electromagnetic devices such as contactors and relays. An energy storage circuit stores charge that can be discharged into a contactor operating coil during partial or full losses of control power and for short durations. Momentary reductions in control power can thus be experienced without opening or otherwise changing the logical state of the contactor. Emergency stop override circuitry may be provided for preventing the ride-through performance, thus enabling the device to provide for both ride-through of short losses of control power, while permitting emergency stopping of loads due to the override.

20 Claims, 2 Drawing Sheets

BROWNOUT RIDE-THROUGH SYSTEM AND METHOD

BACKGROUND

The invention relates generally to the field of electrical switch gear used to supply energizing power to a load. More particularly, the invention relates to a technique for maintaining power applied to such loads during transient losses of power from a grid or other power supply.

A wide range of applications exist for powered loads, particularly in industry, but also in mining applications, material handling applications, marine, commercial, and other fields. In most of these applications power from a source is switched by various switch gear, typically contactors, to apply power to the driven load. The contactors, which may be sometimes referred to as relays of various types, will generally include an electromagnetic operator and a set of moveable contacts which can be moved by energizing the operator. When a control voltage is applied to the operator coil, which essentially forms an electromagnet, an armature is moved by the magnetic flux produced by the coil to open or close the contacts in the device. Opening and closing contacts thus establishes or interrupts a current carrying path through the device to control application of power to the load.

In many applications, the provision of control power is subject to fluctuations in power from the source. That is, relatively small or intermittent loss of power is possible due to fluctuations in the grid, other loads that are switched on and that share the same power source circuitry, and so forth. Certain areas and power networks tend to suffer from such short losses in power on a fairly regular basis. Depending upon the nature of the load and process to which the load is applied, such transient losses of power, which would may be termed "brownouts" can be extremely problematic. For example, driven loads can be caused to stop or start, or circuitry may need to be reset following such common brownouts. The questionable reliability of certain grids and power sources in many locations makes the consistent application of power to loads via contactors and relays particularly problematic, to the point of jeopardizing the ability to reliably drive the process at all.

There is a need, therefore, for techniques that will allow for switch gear to survive short losses in power and maintain power either applied to a load or not applied to a load, depending upon the circuit configuration. There is a particular need for arrangements which will provide for such brownout ride-through while allowing the systems to work with other common circuit configurations, particularly emergency stops that override the ride-through function.

BRIEF DESCRIPTION

The invention provides a novel approach to brownout ride-through devices designed to respond to such needs. The invention may be applied in a wide range of settings, and generally allows for energization of an electromagnetic operator to continue despite short losses in control power. The circuitry may be designed to provide for various degrees of brownout ride-through, such as for fractions of a second to several seconds, and from partial to complete loss of control power. The circuitry may also be designed to permit rapid operation (e.g., energization) of an operator coil despite the presence of energy storage circuitry that is used to power the coil during a transient loss of power. Moreover, the circuitry is specifically designed to accommodate emergency stop equipment and the like typically found in certain industrial settings, while still providing the brownout ride-through function when no emergency stop signal is received or where power has not been interrupted to the entire circuit by an emergency stop.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
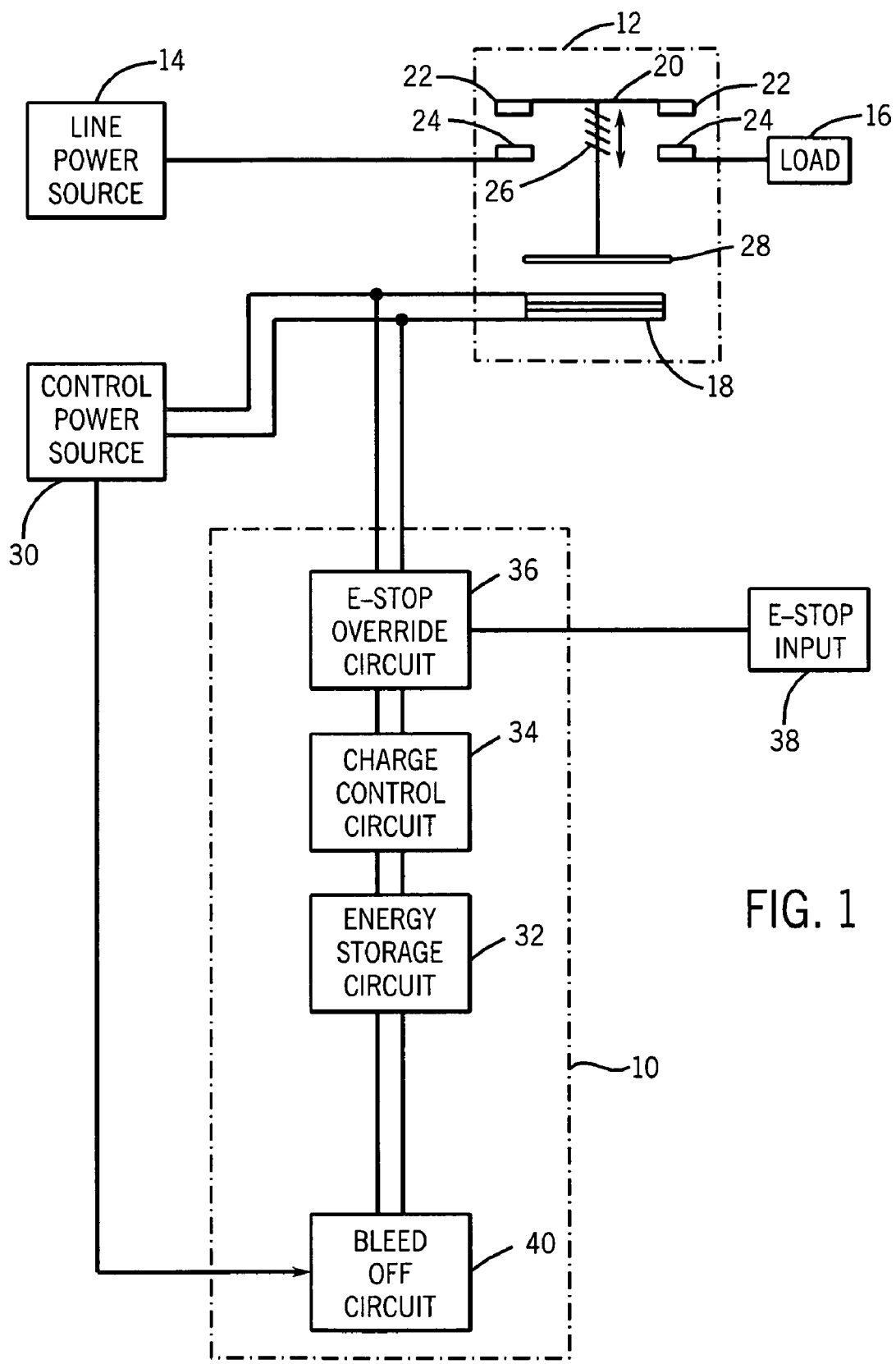
FIG. 1 is a diagrammatical overview of a brownout ride-through circuit including an emergency stop override circuit, and other features in accordance with the present invention.

Turning now to the drawings, and referring first to FIG. 1, a brownout ride-through circuit, designated generally by reference numeral 10, is shown for controlling power applied to a load via a contactor 12. Although reference is made throughout the present discussion to a "contactor" the present invention is not intended to be limited to any particular design of such switch gear. Accordingly, as will be appreciated by those skilled in the art, a contactor is generally a powered electromechanical device that opens and closes a current carrying path in response to a powered control signal. Such devices may be variously referred to as relays, circuit interrupters, and so forth. In general, the invention is directed to controlling or maintaining a desired state of such devices throughout a period of partial or complete loss of control signal power.

As illustrated in FIG. 1, the contactor 12 is disposed in a circuit path between a line power source 14 and a load 16. As will be appreciated by those skilled in the art, many other circuit components may typically be included in the arrangement, but have not been shown in FIG. 1 for the sake of clarity. For example, various fused and manual disconnects may be provided upstream of the contactor 12; signal conditioning circuitry may be included; safety relays may be coupled to the contactor, and so forth. Moreover, the line power source 14 may simply be a power grid, but may also include various power converters, inverters, and so forth. Similarly, the load 16 may include any appropriate load, such as electric motors, valve actuators, or any other suitable load in the overall machine process or system.

Within the contactor 12 a moveable conductive element which may be referred to as a spanner or bridge 20 is displaced to bring moveable contacts 22 into contact with stationary contacts 24. The line power source 14 and the load are coupled to these stationary contacts, such that the bridge 20 and moveable contacts 22 complete a current carrying path through the device when these elements are brought into contact with one another. It should be noted that other contactor designs are known and may be used with the present invention, including devices that have single set of moveable contacts, as well as devices that have multiple sets, such as for three-phase operations.

The moveable contacts are generally held or biased in a default position, in this case an open position, by a biasing device, such as a spring 26. An armature 28 is coupled to the moveable contacts and contact bridge and is attracted by magnetic flux produced by an operator coil 18 when the operator coil 18 receives and energizing voltage. As will be appreciated by those skilled in the art, the operator coil 18, with associated core or armature structures (not shown) forms an electromagnet that produces flux by virtue of a circulating current from the control power source 30. The circulating current produces a Lorentz force that attracts the armature and displaces the moveable contacts toward the stationary contacts against the biasing force of the spring 26 when the control power is applied. As will be readily appreciated by those skilled in the art, the entire structure of the contactor may be wired to operate as a normally-open or normally-closed device, depending upon the exigencies of the application (e.g., whether the load should be normally energized or normally unpowered).

The brownout ride-through circuit 10 is designed to retain and store a charge from the control power source 30 and to provide power to coil 18 in the event of a partial or a complete loss of power from the source for a short duration. As illustrated, the circuit 10 includes an energy storage circuit 32 which will typically include a capacitor or a bank of capacitors designed to store the necessary charge. A charge control circuit 34 is coupled upstream of the energy storage circuit 32 and regulates the charging of the capacitors. That is, to permit rapid energization of the coil 18, it is preferred that the energy storage circuit 32 be charged more slowly over time so as to permit most or all of the current initially applied to the operator coil to produce flux for operation of the contactor. Once energized, and with the contactor in its operative state, the charge control circuit 34 then begins to charge the energy storage circuit 32 until the desired charge is reached.

To permit emergency shutoff of the power to load 16, and to any other desired loads in an installation, the brownout ride-through circuit 10 includes an E-stop override circuit 36. The E-stop override circuit 36 is coupled to an E-stop input 38. As will be appreciated by those skilled in the art, the E-stop input 38 may be any one of a range of typically manual override inputs, such as a conspicuous push button which can be depressed to stop loads in a manufacturing or other process. As will also be appreciated by those skilled in the art, the E-stop input will typically cause an actual interruption in power throughout an application, so as to prevent damage to equipment, work pieces, personnel and so forth. The E-stop input 38 is thus able to force interruption of brownout ride-through power from the energy storage circuit 32 to the coil 18. Thus, when an E-stop signal is received, despite the ability of the energy storage circuit 32 to provide energizing power to the operator coil 18, such power will be completely interrupted by the E-stop override circuit 36.

Finally, the brownout ride-through circuit 10 also includes a bleed off circuit 40 coupled to the energy storage circuit 32. In practice, the bleed off circuit 40 may be part of a charge control circuit 34, and may be powered, such as by the control power source 30. The bleed off circuit 40 effectively drains the charge from the energy storage circuit 32 when control power is purposefully removed from the operator coil 18. That is, the control power source 30 may provide a signal to the bleed off circuit 40 which causes the draining of the energy storage circuit 32 to avoid the discharge of the energy storage circuit 32 to any other device during down time of the contactor and load.

Figure 2:
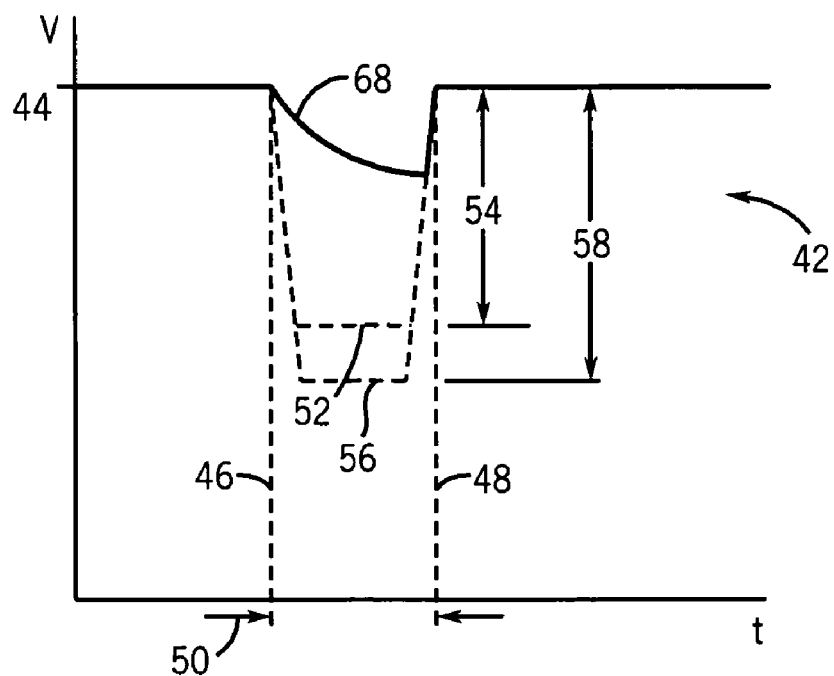
FIG. 2 is a graphical representation of a voltage versus time performance of the circuitry of FIG. 1 in the event of a brownout.
Figure 3:
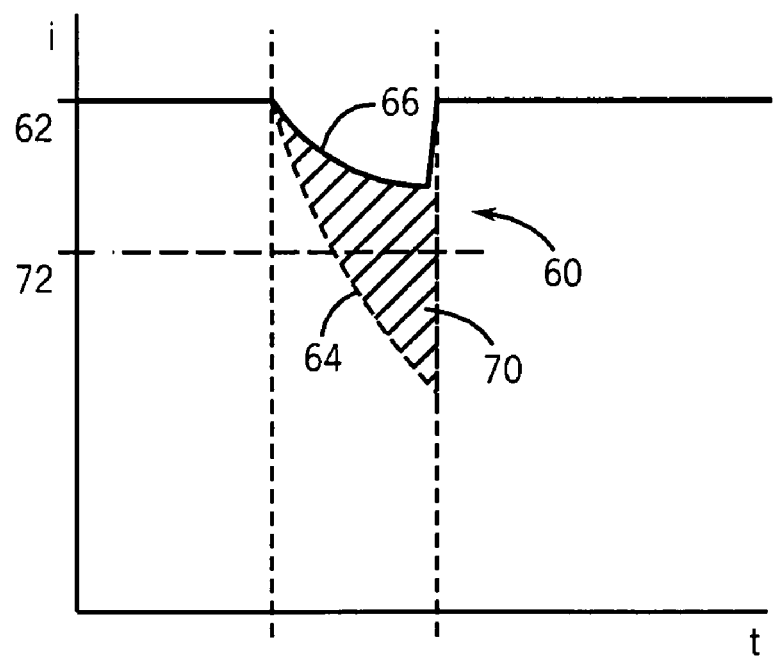
FIG. 3 is a graphical representation of a current versus time performance of the circuitry of FIG. 1 during a temporary loss of power as diagrammed in FIG. 2.

As noted above, the foregoing functional components permit the contactor to remain energized during transitory periods of partial or full interruption of control power to the contactor coil. FIGS. 2 and 3 graphically illustrate the voltage and current levels that may be experienced by the operator coil during such operation. In particular, FIG. 2 generally illustrates the voltage performance or curve 42 that will be seen by the coil. As noted in FIG. 2, the voltage prior to a brownout event will generally be a constant line voltage 44. At the onset of a brownout event, indicated generally by time line 46, the voltage will drop, or be completely or partially interrupted. The end of the brownout event is indicated generally by the time line 48. Between these two times, the voltage of the control power source may droop or be lost completely. The duration 50 of the brownout event is the time required for charge current to be supplied to the coil by the energy storage circuit.

In general, in the event of a loss of power, a drop in voltage will be expected, such as indicated at reference numeral 52 in the absence of the energy storage circuit 32. That is, line 52 represents the actual line voltage during the brownout event. In accordance with one presently contemplated embodiment, a voltage drop 54 corresponding to the lowest level experienced for the line voltage 52 will be on the order of 40% of the rated line voltage 44. In a further embodiment, a deeper droop 56 and line voltage can be experienced and ridden through, corresponding to a voltage drop of 50% as indicated by reference numeral 58 in FIG. 2. Moreover, in presently contemplated embodiments, the duration 50 of the brownout event that can be experienced and ridden through by the foregoing circuitry is on the order of 200 ms. However, other designs are presently contemplated that can experience and thrive through voltage drops of a duration of up to two seconds, and with full loss of line voltage.

As will be appreciated by those skilled in the art, and as described in greater detail below, the energy storage circuit 32 discussed above will be required to store sufficient charge to provide energizing current to the coil to support the voltage in event of a brownout depending upon the size of the coil, the flux required to maintain the moveable armature in the energized position, the resistance of the conductors between the energy storage circuit and the operator coil, and so forth.

FIG. 3 represents a typical current performance trace 60 that might be anticipated during a loss of control power through the use of the foregoing circuitry. The droop in current in the trace 60 from a full or steady state current level 62 is illustrated between the same onset and termination times for the brownout event discussed above with respect to FIG. 2. In the absence of the energy storage circuit 32, then, a droop would be anticipated in the current applied to coil 18 throughout the brownout period. One would anticipate that some support for the current would be experienced by the breakdown of the field within coil 18, but ultimately the current would drop precipitously throughout the brownout period, depending upon the severity of the loss of power. The anticipated current loss may be represented by trace 64 in FIG. 3, while the current droop experienced by the coil by virtue of the discharge of energy storage circuit 32 is represented by segment 66. As can be seen from FIGS. 2 and 3, the discharge of current from the energy storage circuit 32 to the coil 18 effectively supports the voltage, as indicated by segment 68 in FIG. 2 to levels above those that would be experienced if the present brownout ride-through circuitry were not coupled to the coil.

As will be appreciated by those skilled in the art, the charge required to be made up by the energy storage circuit 32 may be represented as the area between trace segment 66 and trace 64 in FIG. 3. That is, the charge is equal to the product of the current provided by the energy storage circuit 32 to the coil times the duration of time for which the current is provided. The selection of the particular capacitors or other components of the energy storage circuit 32, then, is made based upon the amount of charge required to be provided.

As will also be appreciated by those skilled in the art, and as illustrated in FIG. 3, in a typical contactor or relay, the force required to maintain the moveable armature in the energized position is balanced by (and must exceed) the force of the biasing spring against the Lorenz force exerted by the energized coil. So long as the biasing force of the spring is overcome by the magnetic forces, the contactor will resist changing its logical state. This force generally will correspond to some minimum current level as indicated by reference line 72 in FIG. 3. With this in mind, the energy storage circuit 32 effectively provides a current sufficient to maintain this force balance throughout the desired period. As shown in FIG. 3, at some relatively short time following a loss of control power, it would be anticipated that the contactor would open by virtue of a drop in current, as indicated by trace 64 below the minimum current required to maintain the contactor energized (i.e., the intersection between line 72 and trace 64). The brownout ride-through circuitry described above, then, effectively extends the period through which the device may remain energized by maintaining the current above the threshold current 72.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A brownout ride-through system comprising:
an electromagnetic switching device including contacts movable between open and closed positions to provide power to a load upon application of an energizing control signal to a coil assembly; and
an electrical storage device coupled to the switching device and to a source of electrical power, and configured to store a charge and to apply a current to the coil assembly, but not the load, to prevent switching of the switching device upon transient reduction in voltage of the control signal for a transient period.

2. The system of claim 1, wherein the electromagnetic switching device is a remotely operated relay.

3. The system of claim 1, wherein the electromagnetic switching device is a contactor.

4. The system of claim 1, wherein the electrical storage device includes a capacitor.

5. The system of claim 1, wherein the electrical storage device is configured to store sufficient charge to prevent switching of the switching device in response to a voltage reduction of the control signal by at least 50% for at least 200 ms.

6. The system of claim 5, wherein the electrical storage device is configured to store sufficient charge to prevent switching of the switching device in response to a voltage reduction of the control signal by at least 60% for at least 200 ms.

7. The system of claim 5, wherein the electrical storage device is configured to store sufficient charge to prevent switching of the switching device in response to a complete loss of the control signal for at least 200 ms.

8. The system of claim 7, wherein the electrical storage device is configured to store sufficient charge to prevent switching of the switching device in response to a complete loss of the control signal for up to 2 s.

9. The system of claim 1, further comprising an emergency stop circuit configured to override application of current from the electrical storage device to the coil assembly upon receipt of an emergency stop signal.

10. The system of claim 1, further comprising a bleed circuit for bleeding the stored charge from the electrical storage device upon selected removal of power from the system.

11. A brownout ride-through system comprising:
an electromagnetic switching device including contacts movable between open and closed positions to provide power to a load upon application of an energizing control signal to a coil assembly;
an electrical storage device coupled to the switching device and to a source of electrical power, and configured to store a charge and to apply a current to the coil assembly, but not the load, to prevent switching of the switching device upon transient reduction in voltage of the control signal; and
an emergency stop circuit configured to override application of current from the electrical storage device to the coil assembly upon receipt of an emergency stop signal.

12. The system of claim 11, wherein the electrical storage device includes a capacitor.

13. The system of claim 11, wherein the electrical storage device is configured to store sufficient charge to prevent switching of the switching device in response to a voltage reduction of the control signal by at least 50% for at least 200 ms.

14. The system of claim 13, wherein the electrical storage device is configured to store sufficient charge to prevent switching of the switching device in response to a voltage reduction of the control signal by at least 60% for at least 200 ms.

15. The system of claim 13, wherein the electrical storage device is configured to store sufficient charge to prevent switching of the switching device in response to a complete loss of the control signal for at least 200 ms.

16. A method for riding through a brownout comprising:
storing electrical charge in an electrical storage device during application of an energizing control signal to a control coil of an electromagnetic switching device configured to provide power to a load upon energization of the control coil; and
discharging the charge to provide a current to the coil, but not the load, in response to a transient voltage reduction in the control signal to prevent switching of the switching device during a transient period.

17. The method of claim 16, further comprising overriding application of current from the electrical storage device to the coil assembly upon receipt of an emergency stop signal.

18. The method of claim 16, comprising storing a sufficient charge in the electrical storage device to prevent switching of the switching device in response to a voltage reduction of the control signal by at least 50% for at least 200 ms.

19. The system of claim 18, comprising storing a sufficient charge in the electrical storage device to prevent switching of the switching device in response to a voltage reduction of the control signal by at least approximately 60% for at least 200 ms.

20. The system of claim 18, comprising storing a sufficient charge in the electrical storage device to prevent switching of the switching device in response to a complete loss of the control signal for at least 2 s.

* * * * *